(No Model.)
W. KERR.
CROSSCUT SAW.
No. 468,150. Patented Feb. 2, 1892.
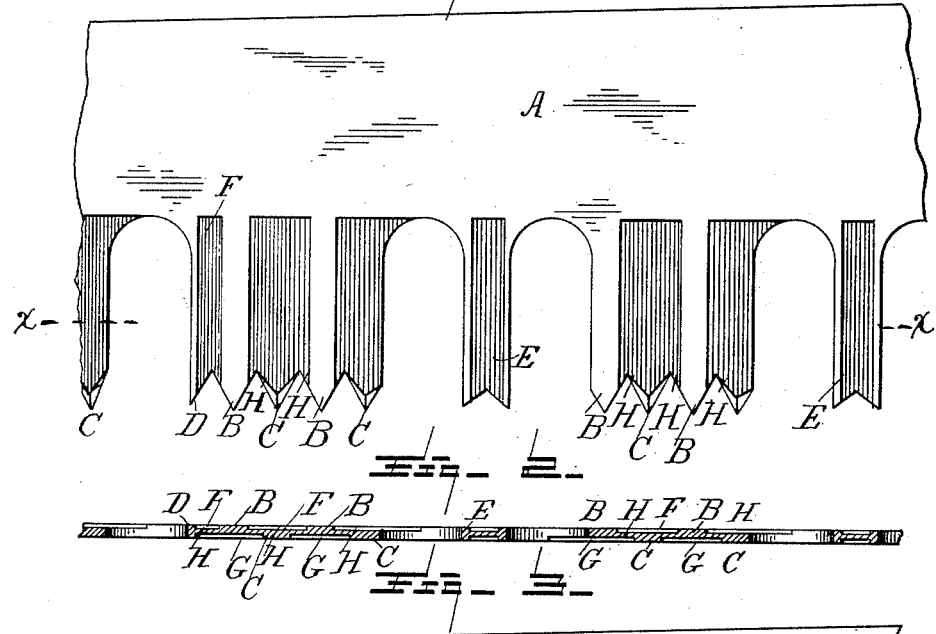
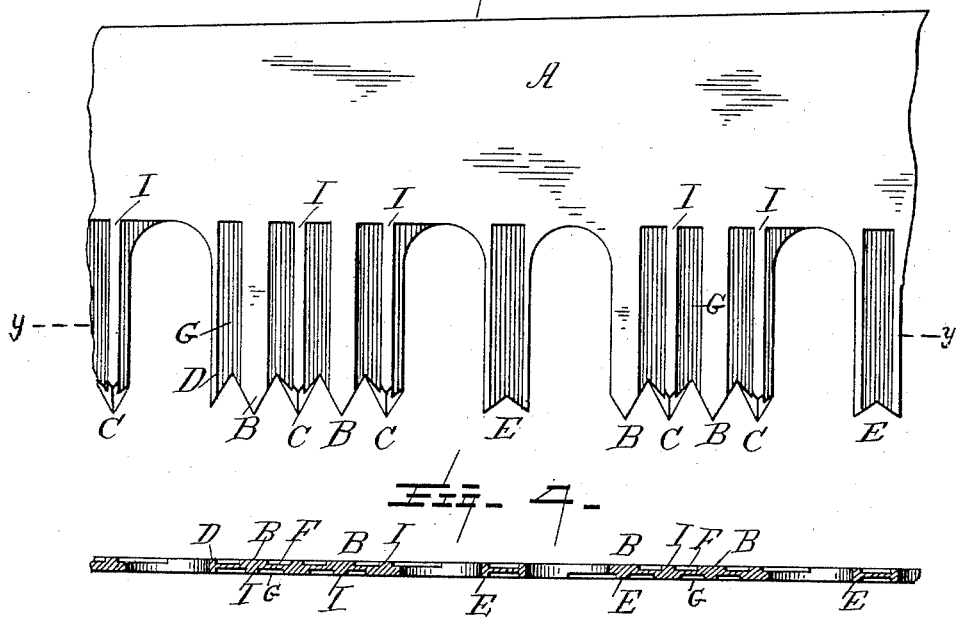
Witnesses:
C. C. Schiller
S. Brashears Jr.
Inventor:
Wm. Kerr
per S. Brashears
Atty

United States Patent Office.

WILLIAM KERR, OF CAINTOWN, CANADA.

CROSSCUT-SAW.

SPECIFICATION forming part of Letters Patent No. 468,150, dated February 2, 1892.

Application filed February 28, 1891. Serial No. 383,218. (No model.)

*To all whom it may concern:*

Be it known that I, WILLIAM KERR, a citizen of Great Britain, residing at Caintown, in the county of Leeds and Province of Ontario, Canada, have invented certain new and useful Improvements in Crosscut-Saws; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to crosscut-saws, and has for its object to so construct them that the filing thereof will be expedited, thus economizing labor in that operation.

With this object in view my invention consists in the improved construction, arrangement, and combination of parts hereinafter fully described, and afterward specifically pointed out in the claims.

Referring to the drawings, Figure 1 is a view in side elevation of a portion of a saw constructed in accordance with my invention. Fig. 2 is a horizontal section therethrough on the line $x$ $x$ of Fig. 1, looking toward the base of the teeth. Fig. 3 is a view similar to Fig. 1, showing a slightly-modified form of my invention; and Fig. 4 is a similar view to Fig. 2, taken on the line $y$ $y$ of Fig. 3.

Like letters of reference mark the same parts wherever they occur in the various figures of the drawings.

Referring to the drawings by letters of reference, A is the body of the saw-blade, B C are the cutting-teeth, D is a single rake or clearing tooth, and E E are double rake or clearing teeth. The fragment of the saw shown is near one end, it being well understood by those skilled in the art that the single rake-teeth are located near the ends and the double rake-teeth in the central portion of the length of the blade. The arrangement of teeth thus described is well known, and it is well known that where the teeth are of the full thickness of the saw-blade the operation of filing is very laborious, inasmuch as the whole thickness must be filed away both upon the edges of the teeth and the parts of the blade which I denominate "webs," between the teeth. Except for the fact that these teeth would be too long and weak to stand the strain put upon them by the work they have to perform, the metal between them might be cut out entirely, and practice has demonstrated that a portion of this web may be removed without materially weakening the teeth. I therefore remove the portions marked F F in Figs. 1 and 2 and G G in Fig. 3. The removal of the portions F F leaves the teeth B flush with the surface on the face of the blade, as shown in Fig. 1, but cuts away that face of the teeth C, while the removal of the portion G leaves the teeth C flush and cuts away the surface of teeth B. These removals also leave the webs H about one half the thickness of the teeth, the total result being that each alternate tooth, as B, cuts full to the edge of the kerf on one side and the alternate teeth C full to the other edge. Every tooth is fully supported its whole length by the webs H, while the thinness of the webs greatly lessens the labor of filing, an operation which must be performed about each alternate day of use.

In the modification shown in Figs. 3 and 4 I provide a rib I on the cut-away portion of the teeth which will serve to stiffen the teeth.

Inasmuch as by my method of construction the teeth are supported and stiffened their entire length from heel to point, I am enabled, without weakening the teeth, to put a considerably increased number in a given length of blade.

Having thus fully described my invention, what I claim as new, and desire to secure by Letters Patent of the United States, is—

1. A saw provided with a series of teeth flush with one surface of the blade, alternating with another set flush with the opposite side, the adjoining teeth being connected by webs thinner than the blade or teeth, for the purpose set forth.

2. A saw provided with a series of teeth thinner than the blade, connected by webs of intervening metal thinner than the teeth, as set forth.

3. A saw consisting of a blade and two alternating series of teeth thinner than the blade, one series being flush with one side of the blade and the other with the opposite surface, the adjacent teeth of the two series being connected by webs of metal thinner than the teeth, as set forth.

4. A saw having a series of teeth thinner than the blade, the alternate teeth being flush with the faces of the blade, respectively, webs of thin metal connecting adjacent teeth, and ribs on the back of the teeth flush with the opposite face of the blade, as set forth.

In testimony whereof I affix my signature in presence of two witnesses.

WILLIAM KERR.

Witnesses:
SHIPLEY BRASHEARS,
S. BRASHEARS, Jr.